United States Patent [19]

Tanikella

[11] 3,910,860
[45] Oct. 7, 1975

[54] FIBERS OF ACID-DYEABLE POLYESTER HAVING TERMINAL TETRAMETHYLPIPERIDINE GROUPS

[75] Inventor: Murty S. Tanikella, Newark, Del.

[73] Assignee: E. I. Du Pont de Nemours and Company, Wilmington, Del.

[22] Filed: Sept. 16, 1974

[21] Appl. No.: 506,585

Related U.S. Application Data

[63] Continuation-in-part of Ser. No. 419,440, Nov. 27, 1973, abandoned, and Ser. No. 403,324, Oct. 3, 1973, each is a continuation-in-part of Ser. No. 290,771, Sept. 20, 1972, abandoned.

[30] Foreign Application Priority Data

Sept. 17, 1973 Germany.......................... 2346734

[52] U.S. Cl............. 260/76; 260/47 CZ; 260/75 N; 260/75 T; 260/77; 260/78.3 R
[51] Int. Cl.² ................................................ C08G 63/68
[58] Field of Search............ 260/75 N, 75 T, 76, 77

[56] References Cited
UNITED STATES PATENTS

| | | | |
|---|---|---|---|
| 2,647,104 | 7/1953 | Shivers................................ | 260/75 |
| 3,352,870 | 11/1967 | Cislak et al...................... | 260/293.63 |
| 3,352,872 | 11/1967 | Cislak............................ | 260/293.63 |
| 3,624,181 | 11/1971 | Munakata et al.................. | 260/860 |
| 3,684,765 | 8/1972 | Matsui et al....................... | 260/45.8 |

FOREIGN PATENTS OR APPLICATIONS

| | | |
|---|---|---|
| 7,013,976 | 3/1971 | Netherlands |
| 2,043,748 | 3/1971 | Germany |
| 2,204,659 | 8/1972 | Germany |
| 32,434 | 8/1972 | Japan |

OTHER PUBLICATIONS

Lutz et al., *J. Org. Chem*, 27, 1695–1703, (1962).

*Primary Examiner*—Melvin Goldstein

[57] ABSTRACT

Acid-dyeable polyester fibers or filaments which are characterized by the presence of 2,2,6,6-tetramethylpiperidine terminal groups on some of the polyester molecules. The modified polyester may be formed by reacting a linear terephthalate polyester with a tetramethyl piperidine compound which has an ester-forming substituent attached at the 1 position or 4 position of the tetramethyl piperdine ring, e.g., 1-(2-hydroxyethyl)-2,2,6,6-tetramethylpiperidine or 2,2,6,6-tetramethyl-4-hydroxypiperidine.

9 Claims, No Drawings

FIBERS OF ACID-DYEABLE POLYESTER HAVING TERMINAL TETRAMETHYLPIPERIDINE GROUPS

REFERENCE TO RELATED APPLICATIONS

This is a continuation-in-part of my copending and now abandoned applications Ser. No. 419,440, filed Nov. 27, 1973, and Ser. No. 403,324, filed Oct. 3, 1973, as continuations-in-part of application Ser. No. 290,771, filed Sept. 20, 1972, and now abandoned.

BACKGROUND OF THE INVENTION

This invention relates to polyesters which are dyeable with acid dyes and their production. It is more particularly concerned with improved polyester fibers of ethylene terephthalate polyesters modified to contain sites for acid dyes.

It is well known that polyester fibers are difficult to dye and that it is necessary to modify the fiber by introduction of dye sites in order to make them substantive to ionic dyestuffs such as acid dyes. Attempts have been made to provide dyeability with acid dyes by incorporating basic nitrogen-containing groups as dye sites in polyesters, as illustrated by Shivers U.S. Pat. No. 2,647,104, granted July 28, 1953, and Munakata et al. U.S. Pat. No. 3,624,181, granted Nov. 30, 1971, but compounds proposed for this purpose have had insufficient thermal stability or borderline basicity, resulting in excessive polymer degradation and/or limited dyeability.

SUMMARY OF THE INVENTION

The present invention provides polyester fibers or filaments having good affinity for acid dyes, while avoiding excessive reduction in molecular weight. The fibers or filaments are composed of a linear terephthalate polyester characterized by the presence, as terminal groups on polyester molecules, of a 2,2,6,6-tetramethylpiperidine compound attached by a single ester-forming substituent at the 1 position or 4 position of the tetramethylpiperidine ring. The polyester comprises an amount of tetramethylpiperdine compound sufficient to obtain the desired dyeability. An amount which provides at least 0.02 weight percent nitrogen, based on the weight of modified polyester, is usually desirable; more than about 0.25 weight percent is usually unnecessary.

The polyester to which the tetramethylpiperidine compound is attached may be any of the fiber-forming linear polyesters. It preferably comprises at least 85 mole percent ethylene terephthalate polmer units. Terephthalate copolyesters containing an aliphatic dicarboxylic constituent are especially preferred because of the enhanced dyeability of the modified polymer. Copolyesters containing at least 85 mole percent of ethylene terephthalate polymer units retain a relatively high level of dyeability when subjected to post-draw, heat-setting treatments.

The examples illustrate preparation of filaments of polyesters modified with 2,2,6,6-tetramethyl-4-hydroxypiperidine, 1-alkyl-2,2,6,6-tetramethyl-4-hydropiperidines, 1-(2-hydroxyethyl)-2,2,6,6-tetramethylpiperidine and ethyl (2,2,6,6-tetramethyl-4-piperidine) acetate. Preferably, the above-mentioned alkyl group has from 1 to 6 carbon atoms, e.g., is a methyl, ethyl, propyl, butyl, pentyl or hexyl group. The tetramethylpiperidine terminal groups can also be attached to polyester molecules by other ester-forming substituents, as disclosed subsequently.

DETAILED DESCRIPTION

The improved acid-dyeable fibers or filaments are composed of polyesters characterized by the presence of 2,2,6,6-tetramethylpiperidine compounds as terminal groups on some of the polyester molecules. Surprisingly, such polyesters are free from undesirable discoloration and have good dyeability. This unexpected achievement is believed to be due, at least in part, to the high basicity of the piperidine nitrogen atom, which leads to strong dye-polymer interactions, and the presence of the 2,2,6,6-methyl substituents which hinder the approach of the reactive centers which cause polymer degradation, for example, discoloration and quaternization reactions, to occur.

When an ester-forming piperidine compound is reacted with a preformed polyester, reaction will largely take place with ester linkages along the polymer chain because of the great number of such groups. Reaction of a monofunctional, ester-forming compound will, therefore, reduce the molecular weight of the preformed polyester. In a system at, or essentially at, equilibrium, the theoretical effect on molecular weight of a given number of equivalents of a monofunctional reactant on a given polyester can be calculated and, accordingly, the loss in molecular weight due to transesterification can be predicted. As is known, the molecular weight of the polymer is related to its viscosity and, for convenience, a change in relative viscosity is used as a measure of change in molecular weight. Piperidine compounds which cause an excessive reduction in relative viscosity beyond that which would be predicted from transesterification are not suitable for use in the present invention.

As indicated above, polymer compositions containing the 2,2,6,6-tetramethylpiperidine group are basic compounds and, as such, have a relatively high affinity for acid dyes and can be dyed in a range of colors including blue, yellow, red and green. As suitable dyestuffs there may be mentioned C.I. Acid Blue 25 (C.I. 62055), C.I. Acid Red 4 (C.I. 14710), C.I. Acid Yellow 40 (C.I. 18950) and C.I. Acid Green 25 (C.I. 61560). Acid dyeability of the polyester composition also is dependent on other factors besides the base strength of the amine used in its preparation. In general, polyester compositions prepared using a given 2,2,6,6-tetramethylpiperidine will have increasing dyeability with increasing amine content and with increasing content of a copolymerizable compound. Compositions of this invention can be dyed at a pH of at least 3.0 and copolyester compositions can be dyed at a pH of 4.5 and above.

The 2,2,6,6-tetramethylpiperdines used in this invention must also exhibit good thermal stability, since polyester preparation and melt-spinning are carried out at elevated temperatures, e.g., temperatures within the range of 240°–300°C. It is apparent, therefore, that the amine should not undergo thermal degradation to produce colored by-products or decomposition products having an adverse effect on polyesters such as, for example, causing excessive reduction in polymer molecular weight.

In addition, the amine used to provide the acid dye sites must be compatible with polyesters. The compatibility of thermally-stable 2,2,6,6-tetramethylpiperidines in polyesters has been found to be surprisingly good. These piperdine compounds can be reacted with polyesters or polyester-forming compositions at elevated temperatures without the development of objectionable discoloration, loss of dyeability or adverse reduction of molecular weight.

The thermally-stable 2,2,6,6-tetramethylpiperidines useful in the practice of this invention may be either secondary or tertiary amines having an ester forming group attached directly to the piperidine ring or attached to a substituent of the piperidine ring. When the esterforming group is on a substituent of the piperidine ring, the substituent linkage to the piperidine ring may be, for example, an alkylene, arylene, ether or sulphonamide linkage. As suitable piperidine compounds, there may be mentioned 2,2,6,6-tetramethyl-4-hydroxypiperidine, 1,2,2,6,6-pentamethyl-4-hydroxypiperidine, 2,2,6,6-tetramethyl-4-(2-hydroxyethyl)piperidine, 1-n-butyl-2,2,6,6-tetramethyl-4-[p-(2-hydroxyethoxy)phenyl] piperidine, 2,2,6,6-tetramethyl-4-(6-hydroxyhexyloxy)piperidine, 2,2,6,6-tetramethyl-4-(p-carboxymethylbenzenesulfonamido)-piperidine, 1-n-propyl-2,2,6,6-tetramethyl-4-(p-carboxymethylbenzenesulfonamido) piperidine, and 4-(carboethoxyanilino)-2,2,6,6-tetramethyl piperidine.

As will be apparent from the foregoing, these piperidine compounds cannot contain strongly basic amino nitrogen other than the piperidine nitrogen, since such compounds will react with the polyesters, but weakly basic amino nitrogen (pKb of 7 or more) may, of course, be present. In addition, when the piperidine nitrogen is a tertiary atom, the substituent cannot be an aryl group or a benzyl group, because of the decrease in thermal stability and/or basicity of such compounds.

Other groupings which are to be avoided because of their adverse effect on thermal stability are spirooxiranes containing the oxygen in a three-membered heterocycle and functional groups, e.g., ether, ester, etc., attached to unsaturated carbon atoms in the piperidine ring.

By polyesters is meant fiber-forming linear condensation polymers containing in the polymer chain the carboxyloxy linking radicals

In the absence of an indication to the contrary, a reference to polyesters is meant to encompass copolyesters, terpolyesters and the like. The polyesters may, if desired, contain additives, e.g., delustrants, viscosity boosters, optical brighteners and the like. In addition, filaments prepared from these polymers may encompass various cross-sectional configurations such as round, multilobal or hollow.

Examples of linear, fiber-forming condensation polyesters are polyethylene terephthalate, polytrimethylene terephthalate, polytetramethylene terephthalate, polyethylene terephthalate/isophthalate (85/15), polyethylene terephthalate/hexahydroterephthalate (90/10), poly(p-hexahydroxylylene terephthalate) and terephthalate copolyesters containing an aliphatic dicarboxylic acid constituent (especially terephthalate/adipate and terephthalate/dimerate copolyesters).

The polyester compositions of this invention usually will have a relative viscosity of from 7.5 to 85, preferably 11 to 30.

The practice of this invention is particularly important with respect to providing acid-dyeable fibers of copolyesters containing at least 85 mole percent of ethylene terephthalate units, since copolyesters such as terephthalate/adipate copolyesters retain a relatively high level of dyeability when subjected to post-draw, heat-setting treatments.

The nitrogen contents of the modified polyesters is determined using the micro Kjeldahl method of analysis.

All percentages given in the examples are by weight based on total weight except as indicated otherwise, and all scour and dye baths use a bath-to-fabric weight ratio of 40:1 except as indicated otherwise. The Triton X-100 wetting agent used in the examples is octylphenol condensed with ethylene oxide in a ratio of 1:8 to 1:9.

EXAMPLE 1

This example illustrates the preparation of aciddyeable polyester filaments using a tertiary amine containing an hydroxyl group attached to the piperidine ring.

A mixture of 18 grams of commercially available 2,2,6,6-tetramethyl-4-hydroxypiperidine, 18 grams of an aqueous solution containing 37% of formaldehyde and 4 milliliters of formic acid containing 1% water is placed in a 100-ml., round-bottomed flask and heated on a steam bath for 7 hours. The contents are cooled, made basic with sodium hydroxide and extracted with ether. The ether extract is dried using anhydrous magnesium sulfate and the ether evaporated. The residue, a white solid, is purified by sublimation at 90°C. at 0.05 millimeters of mercury. The purified 1,2,2,6,6-pentamethyl-4-hydroxypiperidine has a melting point of 70-71°C. and good thermal stability.

The 1,2,2,6,6-pentamethyl-4-hydroxypiperidine is melted and combined at a level of 0.612 weight percent with molten copolyester in a continuous mixer. The copolyester has a relative viscosity of 26.0 and contains 92.8 mole percent ethylene terephthalate units and 7.2 mole percent ethylene adipate units. The molten materials are supplied to the mixer by proportioning or metering pumps, are mixed until the piperidine compound reacts essentially completely with the polyester by way of transesterification reaction, and molten reaction product flows continuously out of the mixer. The mixer temperature is 285°C. and the holdup time in the mixer is 5.25 minutes. The still molten polymer is then spun into a 34-filament yarn at a pack-block temperature of 284°C. and a spinneret temperature of 273°C. The spun yarn passes directly to a draw zone where it is drawn in two stages. The yarn passes from the feed roll at 550 yards (503 meters) per minute to a steam draw-jet and then to draw rolls at 2500 yards (228.5 meters) per minute. The steam used in drawing the yarn is supplied to the jet at a pressure of 50 pounds per square inch (3.52 kilograms per square centimeter) gauge and the temperature in the draw-jet is 225°C. The drawn yarn then passes to a second draw zone and to a second set of draw rolls at a speed of 2508 yards (2293 meters) per minute. The drawn yarn then passes over annealing rolls having a temperature of 115°C. at 2494 yards (2280 meters) per minute. The annealing rolls reduce the shrinkage of the yarn. The drawn yarn has a denier of 150, a tenacity of 3.0 grams per denier, an elongation of 37%, a boil-off shrinkage of 10.8%, a relative viscosity of 14.3 and a nitrogen content of 0.05%. The yarn is knit into a fabric.

Four weighed samples of the fabric are scoured using the procedure described below. A scour bath is prepared using 1%, based on the weight of the fabric (owf) of Triton X-100 wetting agent (obtained by condensing ethylene oxide with an alkyl phenol) and 1% owf of tetrasodium pyrophosphate, and the fabric is placed in the bath. The bath is then heated to the boil at 1.67°C. per minute and boiled 30 minutes. The scoured fabric is then rinsed with hot water.

Four dyebaths are prepared by adding to water at 37.8°C. 1% owf of the wetting agent and adjusting the pH in the separate baths to 4, 5, 6, 7 with phosphoric acid or tetrasodium pyrophosphate as required. The scoured fabrics are then added to the dyebaths and heated 5 minutes with agitation. Then 4% owf of C.I. Acid Blue 25 (C.I. 62055) is added to each bath, the temperature raised to 71.1°C. at 1.67°C. per minute and 20% owf of methylnaphthalene, as a dye carrier, added to each bath. The temperature of the baths is raised to 121.1°C. at 1.67°C. per minute in a pressure dyer and maintained at 121.1°C for 90 minutes.

The dyed fabrics are then scoured in 4 baths prepared by adding, owf, 1% of the wetting agent and 0.5% glacial acetic acid to water at 37.8°C. The scour baths are then heated to 82.2°C. at 1.67°C. per minute and maintained at 82.2°C. for 30 minutes. The fabrics are thoroughly rinsed with unheated tap water and dried. All samples dye to a good depth even though the pH is 4 or above.

EXAMPLE II

This example illustrates the preparation of aciddyeable polyester filaments using a tetramethylpiperidine compound containing an hydroxyl group attached to the piperidine ring.

In a 3-liter, round-bottomed flask are placed 2 kilograms of polyethylene terephthalate having a relative viscosity of 46.9 and 12.6 grams of 2,2,6,6-tetramethyl-4-hydroxypiperidine for melt-blending.

The flask, which is provided with inlet, outlet and stirrer, is purged with nitrogen and evacuated to a pressure of not greater than 1 mm. of mercury. While the contents of the flask are under a vacuum, the flask is sealed. The flask is heated, with stirring, in a salt bath maintained at a temperature of 285°C. until the contents have melted and then heated at 285°C. for an additional 15 minutes. The flask is then removed from the salt bath, stirring continued for 5 minutes and the contents put under nitrogen at a pressure of 1 atm. and allowed to cool. The polymer is cut to 0.125-inch (0.318-cm.) flake. The relative viscosity of the polymer is 17.3.

The polymer is spun into a 34-filament yarn at a pack-block temperature of 283°C. and a spinneret temperature of 285°C. and is drawn in two stages. The yarn is drawn 2.0X at 600 yards (548.6 meters) per minute in the first stage using a draw pin having a temperature of 75°C. and 1.5X in the second stage at 900 yards (823.0 meters) per minute using a hot pipe. The hot pipe has a bottom temperature of 135°C., a middle temperature of 145°C. and a top temperature of 155°C. and the yarn passes around the pipe in a helical wrap. This yarn has a relative viscosity of 14.2 and a nitrogen content of 0.06%. In a separate step, the yarn is drawn a second time at 1.5X on a cold pin using a feed roll speed of 66.6 yards (60.9 meters) per minute and a draw roll speed of 100 yards (91.4 meters) per minute. The doubly-drawn yarn has a denier of 54, a tenacity of 2.9 grams per denier, and an elongation of 39%. The doubly-drawn yarn is knit into fabric.

A weighed sample of the fabric is dyed in a sealed glass tube at 130°C. (chlorobenzene vapors) for 2 hours. The dyebath consists of 1.6% owf of C.I. Acid Blue 25 (C.I. 62055) and, as a carrier, 20% owf of biphenyl and sufficient phosphoric acid to give a pH of 3.5. The fibers are dyed a medium shade of blue.

EXAMPLE III

This example illustrates the effect of the use of an increased amount of piperidine compound. The scour, dyebath and after-scour baths of this example use a bath-to-fabric weight ratio of 50:1.

In the same manner as described in Example II, polymer is prepared using 19.2 grams of 2,2,6,6-tetramethyl-4-hydroxypiperidine per 1200 grams of polymer having a relative viscosity of 46.9. The resulting polymer has a relative viscosity of 10.7. This polymer is then solid-phase polymerized for 96 hours at 180°C. and less than 1 mm. of mercury pressure to give a polymer having a relative viscosity of 19.9. This polymer is spun into a 34-filament yarn at a block temperature of 257°C. and a spinneret temperature of 248°C. and wound to a package at 70 yards (64 meters) per minute. This yarn is then drawn in a two-stage process. The yarn is removed from the package and passes to a feed roll at a speed of 3.67 yards (3.36 meters) and is drawn in a first stage, using a pin having a temperature of 100°C., at a speed of 16.5 yards (15.1 meters) and then in a second stage at a speed of 17 yards (15.5 meters) per minute, and wound to a package. The drawn yarn has a denier of 195, a tenacity of 3.4 grams per denier, 48% elongation, a relative viscosity of 18.7 and a nitrogen content of 0.11%.

A weighed sample of the fabric is scoured using the procedure described below. The fabric is placed in an aqueous scour bath containing 1% owf of a wetting agent (obtained by condensing ethylene oxide with an alkyl phenol) and 1% owf of tetrasodium pyrophosphate. The bath is then heated to the boil at 1.67°C. per minute and boiled 30 minutes. The scoured fabric is then rinsed with hot water.

A dyebath is prepared by adding to water at 37.8°C. 1% owf of the wetting agent and 2.5 grams per liter of monosodium phosphate, and adjusting the pH to 3.5 with phosphoric acid. The scoured fabric is then added to the dyebath and heated 5 minutes with agitation. Then 4% owf of C.I. Acid Blue 25 (C.I. 62055) is added and the temperature raised to 74°C. at 1.67°C. per minute and 40% owf of 2-chloro-4-phenyl phenol is added as a dye carrier to the bath. The temperature of the bath is raised to 138°C. at 1.67°C. per minute in a pressure dyer and maintained at 138°C. for 90 minutes.

The dyed fabric is then scoured in a bath prepared by adding, owf, 1% of the wetting agent and 2.0 grams per liter of sodium carbonate to water at 37.8°C. The scour bath is then heated to the boil at 1.67°C. per minute and maintained at the boil for 30 minutes. The fabric is thoroughly rinsed with unheated tap water and dried. The fibers are dyed a deeper shade of blue than those of Example II.

EXAMPLE IV

This example illustrates the preparation of acid-dyeable copolyester filaments.

A 1.3-kilogram portion of a copolyester having a relative viscosity of 39.8 is melt-blended with 11.5 grams of 2,2,6,6-tetramethyl-4-hydroxypiperidine in the manner described in Example II. The copolyester contains 92.8 mole percent of ethylene terephthalate units and 7.2 mole percent of ethylene adipate units. The treated polymer has a relative viscosity of 12.2. The polymer is cut to 0.125 inch (0.318 cm.) flake and is solid-phase polymerized at a pressure less than 1 mm. of mercury at 180°–190°C. for 58 hours. The polymer is then spun into a 34-filament yarn at a block temperature of 278°C. and a spinneret temperature of 272°C. and the yarns wound to a package at 300 yards (274.3 meters) per minute. The yarn is removed from the package, passed from a feed roll to two pins, the first having a temperature of 140°C. and the second 158°C., at 83 yards (75.9 meters) per minute and to a draw roll at 273 yards (249.6 meters) per minute. The drawn yarn then passes around letdown rolls at 271 yards (248 meters) per minute and is wound up at 267 yards (244.1 meters) per minute. The drawn yarn has a denier of 62, a tenacity of 5.1 grams per denier, an elongation of 30%, a relative viscosity of 22.4 and a nitrogen content of 0.06%.

The yarn is knit into fabric and three weighed samples of the fabric are scoured as described in Example III, except that the bath ratio is 40:1. Three dyebaths are prepared by adding to water at 37.8°C., 1% owf of wetting agent (obtained by condensing ethylene oxide with an alkyl phenol) and adjusting the pH with formic acid or sodium hydroxide as required to give baths having a pH of 3.0, 5.0 and 6.0. The scoured fabrics are then added to the dyebaths and heated 5 minutes with agitation. Then 4% owf of C.I. Acid Blue 25 (C.I. 62055) is added and the temperature is raised to 71.1°C. at 1.67°C. per minute and 40% owf of a dye carrier is added to the bath. The carrier consists of about 50% methyl p-toluate, 25% methyl benzoate and 25% biphenyl. The bath temperature is raised to 76.7°C. and 30% owf of benzoic acid, which functions as a cocarrier, is added. The temperature of the bath is raised to 121.1°C. at 1.67°C. per minute in a pressure dyer and maintained at 121.1°C. for 90 minutes.

The dyed fabrics are then after-scoured in 3 baths prepared by adding, owf, 1% of the wetting agent and 0.5% glacial acetic acid to water at 37.8°C. The scour baths are then heated to 82.2°C. at 1.67°C. per minute and maintained at 82.2°C. for 30 minutes. The fabrics are thoroughly rinsed with unheated tap water and dried. Because the polymer is a copolyester all three fabrics are dyed to a deeper shade of blue than Example III even though the modifier content is lower.

EXAMPLE V

This example illustrates the preparation of an acid-dyeable terephthalate copolyester using dimer acid, a long-chain, aliphatic dibasic acid having alkyl side chains near the center of the molecule. The dimer acid was obtained from the Organic Chemicals Division of Emery Industries, Inc., which states in Bulletin No. 454 (June, 1968) that it is a $C_{36}$ dibasic acid produced by polymerization at mid-molecule of two unsaturated $C_{18}$ monobasic acids.

A sample of polyethylene terephthalate weighing 663 grams and having a relative viscoty of 46.9 is combined with 8.4 grams of 2,2,6,6-tetramethyl-4-hydroxypiperidine and 284 grams of a copolyester having a relative viscosity of 25.9 and melt-blended in the manner described in Example II. The copolyester is prepared from ethylene glycol, terephthalic acid and dimer acid with 92.5 mole percent of the acid units being terephthalate units and the remainder being from dimer acid. The terephthalate/dimerate polymer is cut to 0.125-inch (0.318 cm.) flake and solid-phase polymerized at 183°C. at a pressure of less than 1 mm. for 60 hours. The treated polymer is spun into a 34-filament yarn at a block temperature of 280°C. and a spinneret temperature of 290°C. and wound to a package at 300 yards (274.3 meters) per minute. The yarn is removed from the package and drawn 3.65X at a speed of 272 yards (248.7 meters) per minute, using a pin having a temperature of 120°C., and wound up at 264 yards (241.4 meters) per minute. The drawn yarn has a denier of 59, a tenacity of 2.5 grams per denier, an elongation of 30%, a relative viscosity of 24.3 and a nitrogen content of 0.06%.

The fabric is scoured, dyed and after-scoured as described in Example IV and is dyed to a deep shade of blue.

EXAMPLE VI

This example illustrates how fibers of the present invention can be used in the dyeing of polyester fabrics to three different colors in a single dyebath.

A knit fabric is produced having 3 bands of approximately equal width. One band is knit from the fibers described in Example V. A second band is knit from fibers prepared from polyethylene terephthalate and the third band from fibers prepared from a basic-dyeable copolyester; these fibers being of commercial quality. The basic-dyeable copolyester is prepared from ethylene glycol, terephthalic acid (98 mole percent of acid units) and sodium 3,5-di(carbomethoxy)benzene sulfonate (2 mole percent of acid units) in accordance with the teaching of U.S. Pat. No. 3,018,272 issued to Griffing and Remington.

The fabric is scoured as described in Example IV and then dyed according to the following procedure:

A dyebath is prepared at 37.8°C. with 1% owf of the wetting agent, 6 grams per liter of sodium sulfate and 1% owf of a dyeing assistant. The dyeing assistant is produced by reacting 1 mole of tallowamine with 16 moles of ethylene oxide followed by disulfating with sulfamic acid, and is added to the dyebath in the form of a stock solution. The stock solution consists of 25% dyeing assistant, 6% isopropanol and 69% water. The fabric is then added to the bath and the bath stirred 5 minutes at 37.8°C. Then 0.5% owf of C.I. Basic Blue 3 (C.I. 51005) is added and stirring continued for 5 minutes, then 1.0% owf of C.I. Disperse Yellow 54 is added, stirring continued 5 minutes and the pH adjusted to 6.0 with formic acid or sodium hydroxide as required. The temperature of the bath is then raised to 71.1°C. at 1.67°C. per minute and 40% owf of the carrier of Example I added and the bath held 10 minutes at 71.1°C. Then 30% owf of benzoic acid is added and stirring continued 5 minutes at 71.1°C. Then 2.0% owf of C.I. Acid Red 4 (C.I. 14710) is added and the temperature raised to 121.1°C. at 1.67°C. per minute in a pressure dyer and kept at 121.1°C. for 90 minutes. The dyed fabric is then rinsed and afterscoured as described in Example I. Each band of the fabric is dyed a different color; the polyethylene terephthalate fiber is dyed yellow, the basic-dyeable polyester is dyed green and the fiber of this invention is dyed orange.

EXAMPLE VII

This example illustrates the preparation of acid-dyeable polytetramethylene terephthalate.

Into a polymer test tube are placed 75 gms. of polytetramethylene terephthalate which has an RV of 66.7 and 0.96 gms. of 1,2,2,6,6-pentamethyl-4-hydroxypiperidine. The polymer test tube is provided, via a rubber stopper, with a stirrer and a glass tube. The contents are purged with $N_2$ and evacuated; this process being repeated 5 times. While the contents are under vacuum, the test tube is sealed by pinching off the rubber tube connected to the glass tube. The contents are heated at 255°C. for 20 minutes until melted and then stirred for 0.5 hour. The contents are then put under $N_2$ at a pressure of 1 atmosphere and cooled. The polymer is cut to 0.125-inch (0.318-cm.) flake. The relative viscosity of the polymer is 26.4. The polymer is found to contain 64 equivalents of the piperidyl group per $10^6$ grams of polymer as calculated from a nitrogen content of 0.09%. The polymer is spun into a 5-filament yarn at a block temperature of 254°C. and a spinneret temperature of 255°C. and the yarn wound to a package.

In a separate step the yarn is drawn 4.0X over a hot-pin at 85°C. The feed roll speed is 16.67 yards (15.56 meters) per minute, the draw roll speed is 66.67 yards (62.25 meters) per minute and the wind-up speed is 66 yards (61.6 meters) per minute. The 4.0X drawn fiber is 2 plyed. The 2-plyed yarn has a denier of 98.5, a tenacity of 2.05 grams per denier, an elongation of 51.0% and a modulus of 43.3 grams per denier. The 2-plyed yarn is knit into tubing which dyes to a medium shade at pH of 3.0, and to a light shade at pH of 4.5 when using the following procedure:

The knit tubing is scoured as described in Example I. The scoured fabric is dyed under pressure as described in Example I, except 2% owf of C.I. Acid Blue 25 (C.I. 62055) is used and the carrier consists of about 50% methyl-p-toluate, 25% methyl benzoate and 25% biphenyl. The amount of carrier used is 15% owf. The after-scour procedure is the same as described in Example I except the bath-to-fabric weight ratio is 50:1

EXAMPLE VIII

This example illustrates the preparation of aciddyeable polyester filaments using a tertiary amine.

Into a 400-milliliter Hastalloy pressure tube are placed 62.8 grams of 2,2,6,6-tetramethyl-4-hydroxypiperidine and 35.6 grams of 1-bromobutane. The tube and contents are cooled to −78°C., evacuated and filled with nitrogen. The tube is sealed, shaken and warmed to 100°C. for 1 hour, 120°C. for 1 hour and 150°C. for 30 hours. The tube is cooled and the solid charge is removed and placed in a Soxlet extraction apparatus. The material is extracted for 8 hours with diethyl ether. The resulting ether solution is treated with activated charcoal, filtered and concentrated under vacuum. The residue is distilled at 120°–125°C. at 1 torr (1 mm. Hg. absolute pressure) to give 26 grams of 1-butyl-2,2,6,6-tetramethyl-4-hydroxypiperidine, a white solid melting at 29°–33°C.

Into a polymer test tube are placed 75 grams of a copolyester having an RV of 30.8 and 1.2 grams of 1-butyl-2,2,6,6-4-hydroxypiperidine. The copolyester contains 94.5 mole % of ethylene terephthalate units and 5.5 mole % of ethylene adipate units. The polymer test tube is provided, via a rubber stopper, with a stirrer and a glass tube. The contents are purged with $N_2$ and evacuated; this process being repeated 5 times. While the contents are under vacuum, the test tube is sealed by pinching off the rubber tube connected to the glass tube. The contents are heated at 283°C. for 15 minutes until melted and then stirred for 0.5 hour. The contents are then put under $N_2$ at a pressure of 1 atmosphere and cooled. The polymer is cut to 0.125-inch (0.318-cm.) flake. The flake is then solid-phase polymerized for 140 hours at 190°C. under a pressure of 1 torr (1 mm. of Hg.). The relative viscosity of the polymer is 45.1. The polymer is found to contain 29 eqs. of the piperidyl group per $10^6$ gram of polymer as calculated from a nitrogen content of 0.04%. The polymer is spun into a 5-filament yarn at a block temperature of 260°C. and a spinneret temperature of 265°C. and the yarn wound to a package.

In a separate step, the yarn is drawn 3.0X over a hot pin at 85°C. The feed roll speed is 16.67 yards (15.56 meters) per minute, the draw roll speed is 50.01 yards (45.73 meters) per minute and the wind-up speed is 49.17 yards (44.96 meters) per minute. The drawn fiber is 2-plied. The 2-plied yarn has a denier of 102.0, a tenacity of 1.29 grams per denier, and an elongation of 54%. The 2-plied yarn is knit into tubing which dyes to a medium shade at a pH of 3.0, and to a light shade at a pH of 4.5. The dyeings are carried out as described in Example VII.

EXAMPLE IX

The general procedure of S. M. McElvain and R. E. Lyle, Jr., J.A.C.S. 72, 384–389 (1950) is used for preparing 2,2,6,6-trimethyl-Δ3-dihydro-4-piperidine acetate.

To 200 milliliters of absolute ethanol saturated with ammonia is added 31 grams (0.2 mole) of 2,2,6,6-tetramethyl-4-piperidone and 45.2 grams (0.4 mole) of ethyl cyanoacetate. The resulting mixture is allowed to stand for 48 hours at 0°–10°C. The precipitate obtained is isolated by filtration and air-dried to give 100 grams of colorless crystals melting point 185°–186° with decomposition.

A mixture of 40 grams of this compound, 56 milliliters of concentrated sulfuric acid and 48 milliliters of water is refluxed for 1 hour, then diluted with 64 milliliters of water and refluxing continued for 5 hours. The solution is cooled, neutralized with sodium carbonate, then carefully reacidified with dilute hydrochloric acid and finally concentrated in vacuo. Azeotropic drying (benzene) removes the last traces of water. To the residue is added 500 milliliters of absolute ethanol, concentrated sulfuric acid as catalyst, and the mixture refluxed for about 16 hours, then cooled, concentrated, rendered alkaline with sodium carbonate and thoroughly extracted with portions of ether. The combined ether layers are dried over 4A molecular sieves, and the solvent removed to give a yellow oil which, upon distillation, affords 10.5 grams of a colorless oil, boiling point 78°–80° at 1.5 mm. of mercury. The product is greater than 98% pure by gas chromatography. Analysis, calculated for $C_{13}H_{23}NO_2$: C, 69.33; H, 10.22; N, 6.22. Analysis, found: C, 69.10; H, 10.04; N, 6.85.

A solution of 6.2 grams (0.028 mole) of this compound, ethyl (2,2,6,6-tetramethyl-Δ3-dehydro-4-piperidine)acetate, in 100 milliliters of absolute ethanol is hydrogenated at 70°C. and 60 pounds per square inch (4.2 kilograms per square centimeter) gauge hydrogen over 1 gram of 10% palladium on charcoal for a period of 4 hours. Filtration of the catalyst, and evaporation of the solvent gives 6 grams of a pale yellow oil, which affords, on distillation, a colorless oil boiling point 86° at 2 mm. of mercury. Analysis, calculated for $C_{13}N_{25}NO_2$: C, 68.72; H, 11.01; N, 6.17. Analysis, found: C, 68.83; H, 10.71; N, 6.27. This compound, ethyl(2,2,6,6-tetramethyl-4-piperidine)acetate, is heated in a sealed tube under vacuum for 1 hour at 283°C. The nuclear magnetic resonance and infrared spectra of the heated compound are identical to that of an unheated sample.

In a polymer test tube are placed 1.5 grams of the above compound and 75 grams of copolymer containing 94 mole percent of ethylene terephthalate units and 6 mole percent of ethylene adipate units and having a relative viscosity of 39.4. The polymer test tube is provided, via a rubber stopper, with a stirrer and a glass tube. The contents are purged with nitrogen and evacuated; this process being repeated 4 times. The polymer tube is sealed under vacuum by pinching off a rubber tube connected to the glass tube. The contents are heated at 283°C. until melted (about 20 minutes) and then stirred for 0.5 hour. The polymer is then cooled under nitrogen and cut to 0.318-centimeter flake. The polymer contains 0.08% nitrogen. The polymer is solid-phase polymerized for 120 hours at 190°C. at a pressure less than 1 torr to a relative viscosity of 16.9.

This polymer is spun into a 5-filament yarn at a block temperature of 260°C. and a spinneret temperature of 263°C.

In a separate step the yarn is drawn 3.5X on a hot pin at 85°C. The drawn yarn is then two-plied. The plied yarn has a denier of 45.8, a tenacity of 5.1 grams per denier and an elongation of 35%. The yarn is knit into fabric. The fabric is dyed in baths having a pH of 3.0 and 4.5 at 121°C. for 90 minutes. The baths contain 2% owf of the dye and 15% owf of the carrier of Example IV. The fabrics dye to a light shade of blue.

EXAMPLE X

This example illustrates the preparation of aciddyeable polyester filaments where the terminal piperidyl group is linked to the polyester through the nitrogen atom.

Into a dry, stainless steel bomb having a volume of 400 milliliters, is placed 100 grams of 2,2,6,6-tetramethylpiperidine. The bomb is cooled to −78°C., evacuated, filled with nitrogen and re-evacuated. The bomb is placed on a scale and is attached, with a flexible connection, to a source of ethylene oxide. Ethylene oxide is then passed into the bomb until 40 grams are added. The bomb is sealed and disconnected from the ethylene oxide source and is heated 1 hour at 100°C., 1 hour at 110°C., 1 hour at 120°C. and 8 hours at 155°–160°C. The discharged weight of solid white product is 131 grams. The preparation is repeated once on half scale.

The crude product is dissolved in ether, activated charcoal is added and the suspension is boiled for 5 minutes to remove colored impurities. The solution is filtered and cooled. On filtering the cooled solution, there is obtained 1-(2-hydroxyethyl)-2,2,6,6-tetramethylpiperidine as white needles melting at 93° to 94°C.

Polymer is prepared by polymerizing 75 grams of a copolymer having a relative viscosity of 30.8 and 1.05 grams of 1-(2-hydroxyethyl)-2,2,6,6-tetramethylpiperidine in a polymer test tube. The copolymer is an ethylene terephthalate copolymer containing adipate units equivalent to 5.5% adipic acid and has a relative viscosity of 25.9. The contents are purged with nitrogen and evacuated; the cycle being repeated 4 times. The contents are then heated at 255°C. under nitrogen until melted and stirred for 0.5 hour at 255°C. and then at a pressure not greater than 1 torr for 1 hour at 255°C. The polymer is cooled, cut to flake and solid-phase polymerized for 160 hours at 190°C. at 1 torr. This polymer has a relative viscosity of 33.6 and contains 0.11% nitrogen.

The polymer is then spun into a 5-filament yarn at a block temperature of 265°C. and a spinneret temperature of 264°C. and is wound to a package at 33.4 yards (30.5 meters) per minute.

The yarn is drawn 4.5X. The yarn passes from a feed roll at 16.7 yards (15.3 meters) per minute, over a pin heated at 85°C. and to a draw roll at 75 yards (68.6 meters) per minute and is wound up at 74 yards (67.7 meters) per minute. Two of these yarns are plied. The plied yarn has a denier of 92.2, a tenacity of 3.1 grams per denier and an elongation of 27.1%. This yarn is knit into fabric. The fabric is dyed in baths having a pH of 3.0 and 4.5 at 121°C. for 90 minutes. The baths contain 27% owf of the dye and 15% of the carrier of Example IV. The fabrics dye to a light shade of blue.

I claim:

1. Acid - dyeable textile fibers or filaments of a linear terephthalate polyester characterized by the presence, as terminal groups on polyester molecules, of a 2,2,6,6-tetramethylpiperidine compound attached by a single ester-forming substituent at the 1 position or 4 position of the tetramethylpiperidine ring sufficient to provide at least 0.02 weight percent nitrogen.

2. Fibers or filaments as defined in claim 1 wherein the polyester comprises at least 85 mole percent ethylene terephthalate units.

3. Fibers or filaments as defined in claim 2 wherein the polyester is a terephthalate copolyester containing an aliphatic dicarboxylic constituent.

4. Fibers of filaments as defined in claim 3 wherein the copolyester contains up to 15 mole percent of ethylene adipate polymer units.

5. Fibers or filaments as defined in claim 3 wherein the copolyester contains up to 15 mole percent of ethylene dimerate polymer units.

6. Fibers or filaments as defined in claim 1 wherein 2,2,6,6-tetramethyl-4-hydroxypiperidine is attached to ends of polyester molecules by terephthalate linkages.

7. Fibers or filaments as defined in claim 1 wherein 1-alkyl-2,2,6,6-tetramethyl-4-hydroxypiperidine is attached to ends of polyester molecules by terephthalate linkages.

8. Fibers of filaments as defined in claim 1 wherein 1-(2-hydroxyethyl)-2,2,6,6-tetramethylpiperidine is attached to ends of polyester molecules by terephthalate linkages.

9. Fibers or filaments as defined in claim 1 wherein (2,2,6,6-tetramethyl-4-piperidine) acetate is attached to ends of polyester molecules by ester linkages.

* * * * *

UNITED STATES PATENT OFFICE
CERTIFICATE OF CORRECTION

PATENT NO. : 3,910,860
DATED : October 7, 1975
INVENTOR(S) : Murty S. Tanikella

It is certified that error appears in the above-identified patent and that said Letters Patent are hereby corrected as shown below:

Claim 4 - column 12, line 48 "of" should be --or--.
Claim 8 - column 12, line 61 "of" should be --or--.
Claim 9 - column 12, line 66 before "(2,2,6,6- etc."
          insert --ethyl--.

Signed and Sealed this ninth Day of March 1976

[SEAL]

Attest:

RUTH C. MASON
Attesting Officer

C. MARSHALL DANN
Commissioner of Patents and Trademarks